United States Patent
Furukawa

(10) Patent No.: US 11,011,318 B2
(45) Date of Patent: May 18, 2021

(54) SOLID ELECTROLYTIC CAPACITOR

(71) Applicant: Murata Manufacturing Co., Ltd., Nagaokakyo (JP)

(72) Inventor: Takeshi Furukawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 135 days.

(21) Appl. No.: 16/371,620

(22) Filed: Apr. 1, 2019

(65) Prior Publication Data

US 2019/0244764 A1   Aug. 8, 2019

Related U.S. Application Data

(63) Continuation of application No. PCT/JP2017/030331, filed on Aug. 24, 2017.

(30) Foreign Application Priority Data

Oct. 6, 2016   (JP) .............................. JP2016-197928

(51) Int. Cl.
*H01G 9/025*   (2006.01)
*H01G 9/012*   (2006.01)
(Continued)

(52) U.S. Cl.
CPC ........... *H01G 9/025* (2013.01); *H01G 9/0032* (2013.01); *H01G 9/012* (2013.01); *H01G 9/04* (2013.01); *H01G 9/15* (2013.01)

(58) Field of Classification Search
CPC ............. H01G 9/012; H01G 9/08; H01G 9/15
See application file for complete search history.

(56) References Cited

U.S. PATENT DOCUMENTS

| 6,785,147 B2 | 8/2004 | Miki et al. |
| 7,745,281 B2 | 6/2010 | Prymak et al. |

(Continued)

FOREIGN PATENT DOCUMENTS

| JP | S63268241 A | 11/1988 |
| JP | 2001185460 A | 7/2001 |

(Continued)

OTHER PUBLICATIONS

International Search Report issued in PCT/JP2017/030336, dated Nov. 21, 2017.

(Continued)

*Primary Examiner* — Eric W Thomas
(74) *Attorney, Agent, or Firm* — Arent Fox LLP

(57) ABSTRACT

A solid electrolytic capacitor comprises a capacitor element including a valve-acting metal substrate including a core part and a porous part disposed on at least one principal surface of the core part, a dielectric layer formed on a surface of the porous part and a solid electrolyte layer is disposed on the dielectric layer. The capacitor element further includes a conductive layer disposed on the solid electrolyte layer. A sealing resin is located on the conductive layer and seals a principal surface of the capacitor element. A cathodic outer electrode is located on the sealing resin and is electrically connected to the conductive layer by a cathodic via electrode which extends through the sealing resin. An anodic outer electrode is electrically connected to the core part.

23 Claims, 6 Drawing Sheets

(51) Int. Cl.
*H01G 9/04* (2006.01)
*H01G 9/00* (2006.01)
*H01G 9/15* (2006.01)

(56) References Cited

U.S. PATENT DOCUMENTS

| | | | |
|---|---|---|---|
| 8,994,193 | B2 | 3/2015 | Tateiwa et al. |
| 10,186,383 | B2 | 1/2019 | Hattori et al. |
| 2004/0095710 | A1 | 5/2004 | Miki et al. |
| 2005/0185362 | A1* | 8/2005 | Arai ................. H01G 9/012 361/535 |
| 2008/0216296 | A1 | 9/2008 | Prymak et al. |
| 2013/0249075 | A1 | 9/2013 | Tateiwa et al. |
| 2016/0329158 | A1 | 11/2016 | Hattori et al. |
| 2019/0228915 | A1 | 7/2019 | Furukawa |
| 2019/0244764 | A1 | 8/2019 | Furukawa |

FOREIGN PATENT DOCUMENTS

| | | |
|---|---|---|
| JP | 2003045762 A | 2/2003 |
| JP | 2007138236 A | 6/2007 |
| JP | 2008135427 A | 6/2008 |
| JP | 2010520647 A | 6/2010 |
| JP | 2011044607 A | 3/2011 |
| JP | 2011108901 A | 6/2011 |
| JP | 2013197382 A | 9/2013 |
| JP | WO2018066254 A1 | 6/2019 |
| WO | 2012133839 A1 | 10/2012 |
| WO | 2015118901 A1 | 8/2015 |
| WO | 2018066253 A1 | 4/2018 |

OTHER PUBLICATIONS

Written Opinion of the International Searching Authority issued in PCT/JP2017/030336, dated Nov. 21, 2017.
International Search Report issued for PCT/JP2017/030331, dated Nov. 21, 2017.
Written Opinion of the Intenational Searching Authority issued for PCT/JP2017/030331, dated Nov. 21, 2017.

* cited by examiner

SOLID ELECTROLYTIC CAPACITOR

CROSS REFERENCE TO RELATED APPLICATIONS

The present application is a continuation of International application No. PCT/JP2017/030331, filed Aug. 24, 2017, which claims priority to Japanese Patent Application No. 2016-197928, filed Oct. 6, 2016, the entire contents of each of which are incorporated herein by reference.

TECHNICAL FIELD

The present invention relates to a solid electrolytic capacitor.

BACKGROUND OF THE INVENTION

Solid electrolytic capacitors typically include a capacitor element that includes a valve-acting metal substrate including a core part composed of a valve metal, such as aluminum, and a porous part formed in the surface of the core part, a dielectric layer formed in the surface of the porous part, a solid electrolyte layer disposed on the dielectric layer, and a conductive layer disposed on the solid electrolyte layer.

Japanese Unexamined Patent Application Publication No. 2008-135427 ("Patent Document 1" 0) discloses a solid electrolytic capacitor where a plurality of capacitor elements are stacked on top of one another. The capacitor elements are then electrically connected to a lead frame, and resin sealing is subsequently performed by transfer molding or the like. In another case, the capacitor elements are electrically connected to a mount board, such as a printed circuit board, instead of a lead frame and resin sealing is subsequently performed.

The part of a solid electrolytic capacitor which is responsible for the formation of electrostatic capacity (hereinafter, such a part is referred to as "capacitance formation part") is the porous part, such as an etched layer, in which the dielectric layer is formed. It is advantageous to reduce the distance between the capacitance formation part and an outer electrode from which current is drawn, such as a lead frame, for reducing the ESR (equivalent series resistance) and ESL (equivalent series inductance) of a solid electrolytic capacitor. However, in the production methods used in the related art in which a plurality of capacitor elements are stacked on top of one another, the distance between the capacitance formation part and the outer electrode is large and, accordingly, the ESR and ESL of a solid electrolytic capacitor are reduced disadvantageously. Furthermore, in the production methods used in the related art, it is difficult to increase the ratio of the volume of the capacitance formation part to the overall volume of the capacitor. Thus, it is difficult to produce a thin solid electrolytic capacitor having a low ESR and a low ESL by the production methods used in the related art.

The present invention was made in order to address the above issues. An object of the present invention is to provide a solid electrolytic capacitor that may have a low ESR, and a low ESL, and a small thickness.

BRIEF SUMMARY OF THE INVENTION

The solid electrolytic capacitor according to the present invention includes a capacitor element including a valve-acting metal substrate including a core part and a porous part disposed on at least one principal surface of the core part, a dielectric layer formed in a surface of the porous part, a solid electrolyte layer disposed on the dielectric layer, and a conductive layer disposed on the solid electrolyte layer; a sealing resin with which a principal surface of the capacitor element is sealed; a cathodic outer electrode electrically connected to the conductive layer; and an anodic outer electrode electrically connected to the core part. The sealing resin and the cathodic outer electrode are disposed on and above the conductive layer in this order. The sealing resin disposed on the conductive layer is provided with a cathodic via electrode formed in the sealing resin, the cathodic via electrode penetrating the sealing resin. The conductive layer is electrically drawn to a surface of the sealing resin through the cathodic via electrode. The cathodic via electrode exposed at the surface of the sealing resin is connected to the cathodic outer electrode.

In the solid electrolytic capacitor according to the present invention, the cathodic via electrode may be a paste electrode including a material formed by curing a conductive paste, and the cathodic via electrode may be a columnar metal pin.

In the solid electrolytic capacitor according to the present invention, when viewed in the direction of the normal to the principal surface of the capacitor element, the cathodic outer electrode preferably has a larger size than the cathodic via electrode so as to cover the cathodic via electrode.

In a first embodiment of the present invention, an insulating layer is interposed between the core part and the sealing resin; the insulating layer, the sealing resin, and the anodic outer electrode are disposed on and above the core part in this order; a first anodic via electrode is formed in the sealing resin disposed on the insulating layer so as to penetrate the sealing resin, and a second anodic via electrode is formed in the insulating layer disposed on the core part so as to penetrate the insulating layer; the core part is electrically drawn to the surface of the sealing resin through the first and second anodic via electrodes; and the first anodic via electrode exposed at the surface of the sealing resin is connected to the anodic outer electrode.

In the first embodiment of the present invention, on a principal surface of the valve-acting metal substrate, a surface of the core part is preferably at a lower level than the surface of the porous part.

In the first embodiment of the present invention, the first and second anodic via electrodes may be plated electrodes, and the first and second anodic via electrodes may be paste electrodes including a material formed by curing a conductive paste.

In the first embodiment of the present invention, each of the first and second anodic via electrodes preferably has a reversely tapered cross-sectional shape, the width of the reversely tapered cross-sectional shape increasing in the direction from the core part toward the anodic outer electrode.

In the first embodiment of the present invention, the first and second anodic via electrodes may be columnar metal pins.

In the first embodiment of the present invention, the insulating layer may be composed of the same material as the sealing resin.

In a second embodiment of the present invention, the sealing resin and the anodic outer electrode are disposed on and above the core part in this order; a first anodic via electrode is formed in the sealing resin disposed on the core part so as to penetrate the sealing resin; the first anodic via electrode is arranged to come into direct contact with the core part; the core part is electrically drawn to the surface of the sealing resin through the first anodic via electrode; and the first anodic via electrode exposed at the surface of the sealing resin is connected to the anodic outer electrode.

In the second embodiment of the present invention, on a principal surface of the valve-acting metal substrate, a surface of the core part is preferably at a higher level than the surface of the porous part or at the same level as the surface of the porous part.

In the second embodiment of the present invention, the first anodic via electrode may be a plated electrode, and the first anodic via electrode may be a paste electrode including a material formed by curing a conductive paste.

In the second embodiment of the present invention, the first anodic via electrode preferably has a reversely tapered cross-sectional shape, the width of the reversely tapered cross-sectional shape increasing in the direction from the core part toward the anodic outer electrode.

In the second embodiment of the present invention, the first anodic via electrode may be a columnar metal pin.

In the first and second embodiments of the present invention, when viewed in the direction of the normal to the principal surface of the capacitor element, the anodic outer electrode preferably has a larger size than the first anodic via electrode so as to cover the first anodic via electrode.

In the solid electrolytic capacitor according to the present invention, the anodic outer electrode and the cathodic outer electrode may be metal electrodes including a metal film; the anodic outer electrode and the cathodic outer electrode may be paste electrodes including a material formed by curing a conductive paste; the anodic outer electrode may be a ball-like terminal; and the cathodic outer electrode may be a ball-like terminal.

In the solid electrolytic capacitor according to the present invention, a surface of the solid electrolytic capacitor, the surface being other than a surface that includes the anodic outer electrode and the cathodic outer electrode, may be covered with another insulating layer.

In the solid electrolytic capacitor according to the present invention, a stress relaxation layer may be interposed between the capacitor element and the sealing resin; and a damp-proof membrane may be interposed between the capacitor element and the sealing resin.

According to the present invention, a solid electrolytic capacitor that may have a low ESR, and a low ESL, and a small thickness can be provided.

BRIEF DESCRIPTION OF DRAWINGS

FIGS. 2-1(a) through 2-2(l) are schematic perspective views illustrating an example of the method for producing the solid electrolytic capacitor 1 illustrated in FIG. 1(a).

FIGS. 4-1(a) through 4-2(k) are schematic perspective views illustrating an example of the method for producing the solid electrolytic capacitor 2 illustrated in FIG. 3(a).

DESCRIPTION OF THE PREFERRED EMBODIMENTS

Figure 1:
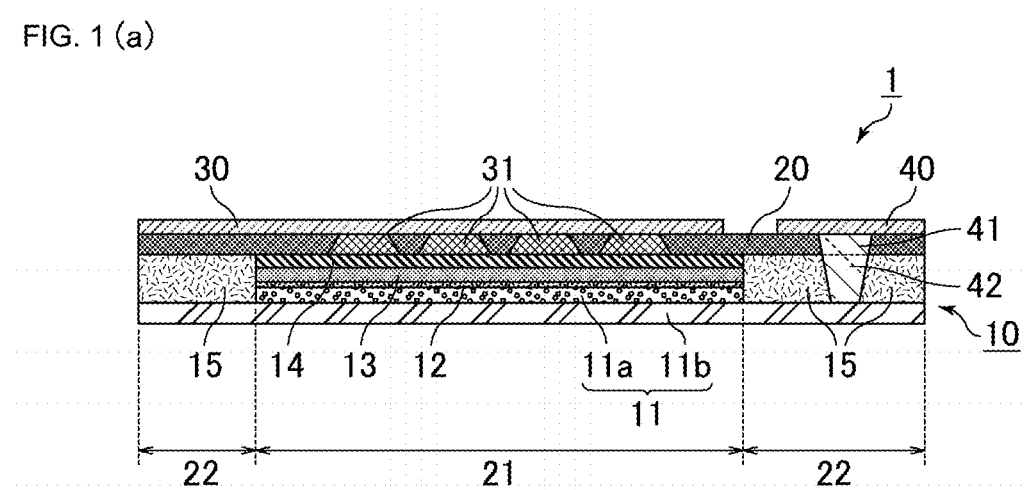
FIG. 1(a) is a schematic cross-sectional view of an example of a solid electrolytic capacitor according to a first embodiment of the present invention.
FIG. 1(b) is a schematic cross-sectional view of an example of a capacitor element included in the solid electrolytic capacitor illustrated in FIG. 1(a).
FIG. 1(c) is a schematic perspective view of an example of a capacitor element included in the solid electrolytic capacitor illustrated in FIG. 1(a).
Figure 1:
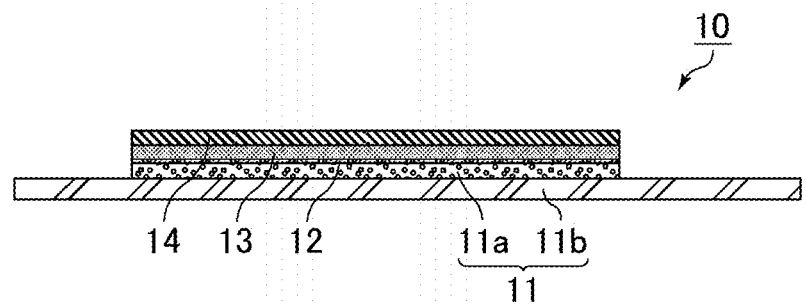
Figure 1:
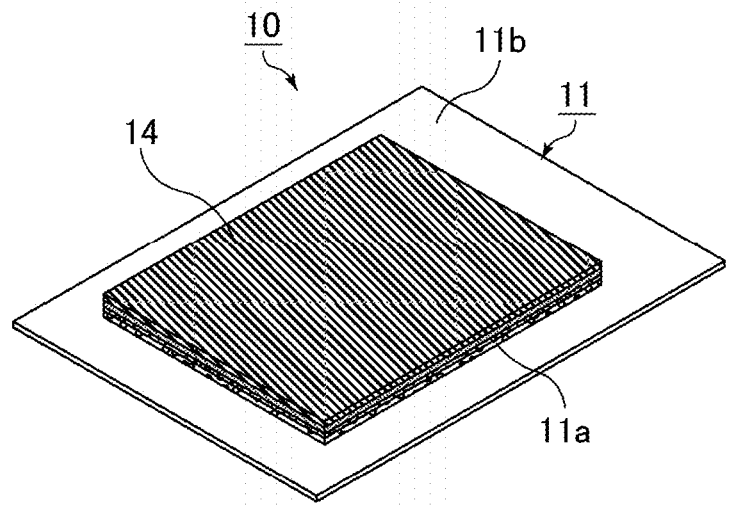

Referring now to the drawings wherein like numerals indicate like elements, several preferred embodiments of the invention will be described. However, the present invention is not limited to the structures described below. Variations and modifications may be made without departing from the spirit and scope of the present invention. The present invention also includes a combination of two or more of the desirable structures of the present invention which are described below.

It should be understood that the following embodiments are merely illustrative and partial replacements or combinations of structures described in different embodiments are also possible. In the second embodiment and thereafter, the description of items common to the first embodiment is omitted, and only the differences are described. Especially, similar actions and effects of a similar structure is not mentioned in each of the embodiments.

In the solid electrolytic capacitor according to certain embodiments of the present invention, the sealing resin and the cathodic outer electrode are disposed on the conductive layer in this order, the cathodic via electrode is formed in the sealing resin disposed on the conductive layer, and the conductive layer is electrically drawn to the surface of the sealing resin through the cathodic via electrode. Since the functions are concentrated on only one side of the valve-acting metal substrate and the sizes of the functional layers other than the capacitance formation part (the part responsible for the formation of electrostatic capacity) are minimized, the ratio of the volume of the capacitance formation part to the overall volume of the capacitor may be increased. This enables an increase in the volumetric efficiency of the capacitance formation part and the production of a thin solid electrolytic capacitor.

Specifically, arranging the outer electrodes on the surface of the sealing resin eliminates the need to use a thick electrode, such as a mount board or a lead frame. This enables the overall thickness of the product to be reduced while maintaining the thicknesses of the functional layers inside the capacitor element.

In addition, the distance the conductive layer disposed in a cathode part is drawn to the outer electrode is small at any position. This enables the ESR and ESL of a solid electrolytic capacitor to be reduced compared with solid electrolytic capacitors known in the related art.

First Embodiment

In the first embodiment of the present invention, an insulating layer is interposed between the core part and the sealing resin; the insulating layer, the sealing resin, and the anodic outer electrode are disposed on and above the core part in this order; a first anodic via electrode is formed in the sealing resin disposed on the insulating layer, and a second anodic via electrode is formed in the insulating layer disposed on the core part; and the core part is electrically drawn to the surface of the sealing resin through the first and second anodic via electrodes. One of the structural advantages of the first embodiment of the present invention is that the insulating layer, which comes into direct contact with the porous part, and the sealing resin may be composed of different materials. Since the surface of the cathode part which faces the principal surface of the capacitor element is covered with the sealing resin and the cathodic outer electrode and therefore has a substantially hermetically sealed structure, the possible routes through which moisture may enter from the outside are primarily the insulating layer and the interfaces between the above layers. Forming the insulating layer using a material having high adhesion and high vapor resistance enables the production of a solid electrolytic capacitor having excellent reliability. Furthermore, the anode and cathodic outer electrodes may be disposed on the same side. This makes it possible to produce a thin solid electrolytic capacitor.

Figures 1A, 2:
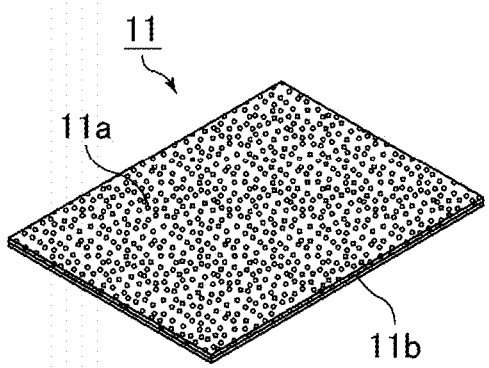
Figures 1B, 2:
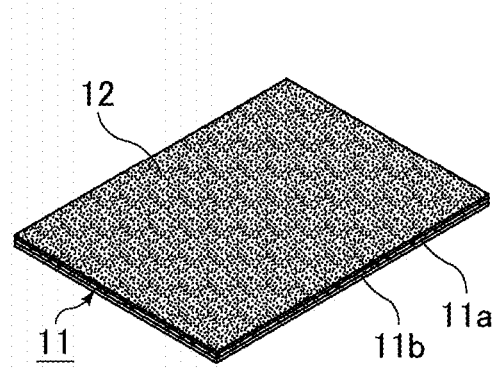

As illustrated in FIGS. 1(a) and 1(b), the solid electrolytic capacitor 1 of the first preferred embodiment includes a capacitor element 10, a sealing resin 20, a cathodic outer electrode 30, and an anodic outer electrode 40. The capacitor element 10 includes a valve-acting metal substrate 11 which includes a core part 11b and a porous part 11a disposed on a principal surface of the core part 11b, a dielectric layer 12 formed on the surface of the porous part 11a, a solid electrolyte layer 13 disposed on the dielectric layer 12, and a conductive layer 14 disposed on the solid electrolyte layer 13. An insulating layer 15 is disposed on the outer periphery of the core part 11b and insulates the sealing resin 20 from the core part 11 b and the lateral edges of the porous part 11a as illustrated in FIG. 1(a).

In the solid electrolytic capacitor 1 illustrated in FIG. 1(a), the top surface of the valve acting metal substrate 11 includes the top surface of the porous part 11a and the top surface of the core part 11b located laterally outward of the porous part (i.e., left and right of the porous part 11a as viewed in FIGS. 1(a) and 1(b). In this embodiment, the top surface of the core part 11b is located below the top surface of the porous part 11a. Alternatively, the top surface of the core part 11 a can be above or at the same level as the top surface of the porous part 11a. The foregoing references to "top surface" is with reference to the orientation of the core part 11b and the porous part 11 a as viewed in FIGS. 1(a) and 1(b).

Figures 1C, 2:
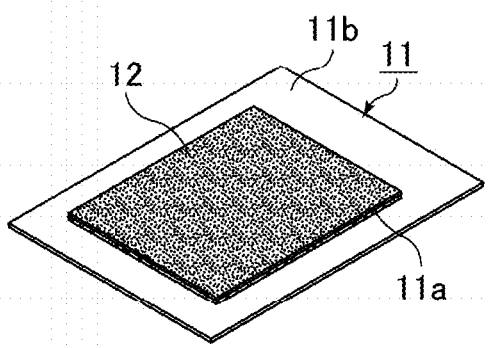

It is preferable that the porous part 11a be disposed at the center of the valve-acting metal substrate 11 and the core part 11b be disposed both at the center and on the peripheral portion of the valve-acting metal substrate 11 as illustrated in FIGS. 1(b) and 1(c).

In this embodiment, the upper principal surface of the capacitor element 10 is sealed with the sealing resin 20 such that the sealing resin 20 is disposed on the conductive layer 14 and the insulating layer 15 and covers the entire upper principal surface of the capacitor element 10.

The cathodic outer electrode 30 is electrically connected to the conductive layer 14. In the solid electrolytic capacitor 1 illustrated in FIG. 1(a), the sealing resin 20 and the cathodic outer electrode 30 are disposed on and above the conductive layer 14 in this order, and cathodic via electrodes 31 are formed in the sealing resin 20 disposed on the conductive layer 14 so as to penetrate the sealing resin 20. The conductive layer 14 (a cathode part 21) is electrically drawn to the surface of the sealing resin 20 by the cathodic via electrodes 31. The portion of the cathodic via electrodes 31 exposed at the surface of the sealing resin 20 are connected to the cathodic outer electrode 30.

The form of the cathodic via electrodes 31 is not limited; the cathodic via electrodes 31 may be, for example, paste electrodes. The term "paste electrode" used herein refers to an electrode composed of a material formed by curing a conductive paste. Cathodic via electrodes 31 that are paste electrodes may be readily formed by forming bump electrodes, covering the bump electrodes with the sealing resin, and trimming the sealing resin as described below.

In the example illustrated in FIG. 1(a), the cathodic via electrodes 31 have a tapered cross-sectional shape the width of which increases in the direction from the cathodic outer electrode 30 toward the conductive layer 14. In the case where the cathodic via electrodes 31 are paste electrodes, the cathodic via electrodes 31 may, for example, have the tapered cross-sectional shape or a rectangular cross-sectional shape the width of which substantially does not change in the direction from the cathodic outer electrode 30 toward the conductive layer 14.

The cathodic via electrodes 31 may be columnar metal pins. In the case where the cathodic via electrodes 31 are the metal pins, the cathodic via electrodes 31 preferably have a rectangular cross-sectional shape the width of which substantially does not change in the direction from the cathodic outer electrode 30 toward the conductive layer 14. Examples of the shape of the metal pins include a cylindrical shape.

Although four cathodic via electrodes 31 are illustrated in FIG. 1(a), more or less cathodic via electrodes 31 may be used. The number of the cathodic via electrodes 31 is at least one.

The height of the cathodic via electrodes 31 is preferably equal to the thickness of the sealing resin 20. The height of the cathodic via electrodes 31 is not limited and preferably 5 μm or more and 200 μm or less.

The form of the cathodic outer electrode 30 is not limited; the cathodic outer electrode 30 may be, for example, a metal electrode or a paste electrode. The term "metal electrode" used herein refers to an electrode composed of a metal film. Examples of the metal film include a plating film, a sputtered film, and a vapor-deposited film.

In the case where the cathodic outer electrode 30 is a metal electrode, the anodic outer electrode 40 is preferably also a metal electrode and may be a paste electrode. Similarly, in the case where the cathodic outer electrode 30 is a paste electrode, the anodic outer electrode 40 is preferably also a paste electrode and may be a metal electrode. In the case where a metal electrode is used, the outer electrode is preferably grown directly on the surface of the metal constituting the via electrode. This may reduce the electric resistance. In the case where a paste electrode is used, the adhesion of the outer electrode to the via electrode is increased. This may enhance the reliability.

The shape of the cathodic outer electrode 30 is also not limited. When viewed in the direction of the normal to a principal surface of the capacitor element 10, the cathodic outer electrode 30 preferably has a larger size than the cathodic via electrodes 31 so as to cover the cathodic via electrodes 31.

The cathodic outer electrode 30 may be a ball-like terminal disposed on the cathodic via electrodes 31. Examples of the ball-like terminal include a BGA (ball grid array) terminal.

The anodic outer electrode 40 is preferably electrically connected to the core part 11b. In the solid electrolytic capacitor 1 illustrated in FIG. 1(a), the insulating layer 15, the sealing resin 20, and the anodic outer electrode 40 are disposed on and above the core part 11b in this order. A first anodic via electrode 41 is preferably formed in the sealing resin 20 disposed on the insulating layer 15 so as to penetrate the sealing resin 20. A second anodic via electrode 42 is preferably formed in the insulating layer 15 disposed on the core part 11b so as to penetrate the insulating layer 15. The core part 11b (an anode part 22) is electrically drawn to the surface of the sealing resin 20 through the first and second anodic via electrodes 41 and 42. The first anodic via electrode 41 exposed at the surface of the sealing resin 20 is connected to the anodic outer electrode 40. Although FIG. 1(a) illustrates a boundary line between the first and second anodic via electrodes 41 and 42 in order to distinguish the first and second anodic via electrodes 41 and 42 from each other, the first and second anodic via electrodes may be formed in one continuous piece.

The form of the first anodic via electrode 41 is not limited; the first anodic via electrode 41 may be, for example, a plated electrode or a paste electrode. The form of the second anodic via electrode 42 is also not limited; the second anodic via electrode 42 may be, for example, a plated electrode or a paste electrode. In the case where the first anodic via electrode 41 is a plated electrode, the second anodic via electrode 42 is preferably also a plated electrode and may be a paste electrode. Similarly, in the case where the first anodic via electrode 41 is a paste electrode, the second anodic via electrode 42 is preferably also a paste electrode and may be a plated electrode.

In the example illustrated in FIG. 1(a), the first and second anodic via electrodes 41 and 42 each have a reversely tapered cross-sectional shape, i.e., one where the width of the via electrode increases in the direction from the core part 11b toward the anodic outer electrode 40. In the case where the first and second anodic via electrodes 41 and 42 are plated electrodes, the first and second anodic via electrodes 41 and 42 preferably have the reversely tapered cross-sectional shape. In such a case, it becomes possible to increase the size of the capacitance formation part while maintaining the area of the region that can be sealed with the resin. Furthermore, when the first and second anodic via electrodes 41 and 42 have the reversely tapered cross-sectional shape, a high fill-up efficiency may be achieved during plating.

The first and second anodic via electrodes 41 and 42 may be columnar metal pins. In the case where the first and second anodic via electrodes 41 and 42 are metal pins, the first and second anodic via electrodes 41 and 42 preferably have a rectangular cross-sectional shape the width of which substantially does not change in the direction from the anodic outer electrode 40 toward the core part 11b. Examples of the shape of the metal pins include a cylindrical shape.

Although a single first anodic via electrode 41 and a single second anodic via electrode 42 are illustrated in FIG. 1(a), more via electrodes 41 and 42 may be used. Although the anode part 22 is present on the left and right sides of the solid electrolytic capacitor 1 illustrated in FIG. 1(a) and the first and second anodic via electrodes 41 and 42 are formed in the right anode part 22, the first and second anodic via electrodes 41 and 42 may be also formed in the left anode part 22.

The form of the anodic outer electrode 40 is not limited; the anodic outer electrode 40 may be, for example, a metal electrode or a paste electrode.

The shape of the anodic outer electrode 40 is not limited. When viewed in the direction of the normal to a principal surface of the capacitor element 10, the anodic outer electrode 40 preferably has a larger size than the first anodic via electrode 41 so as to cover the first anodic via electrode 41.

The anodic outer electrode 40 may be a ball-like terminal disposed on the first anodic via electrode 41. Examples of the ball-like terminal include a BGA (ball grid array) terminal.

In FIG. 1(a), the cathodic outer electrode 30 and the anodic outer electrode 40 are arranged so that they do not come into contact with each other and are insulated from each other on the surface of the sealing resin 20.

Various modifications are possible. For example, a surface of the solid electrolytic capacitor 1 other than the surface that includes the anodic outer electrode 40 and the cathodic outer electrode 30 may optionally be covered with another insulating layer in order to protect the other surface. By way of another example, example, a stress relaxation layer and a damp-proof membrane may optionally be interposed between the capacitor element and the sealing resin in order to protect the capacitor element.

The valve-acting metal substrate included in the solid electrolytic capacitor according to the present invention is composed of a valve-action metal that has a "valve action". Examples of the valve-action metal include metal elements such as aluminum, tantalum, niobium, titanium, and zirconium and alloys including the above metal elements. Among the above valve-action metals, aluminum and an aluminum alloy are preferable.

The valve-acting metal substrate is preferably plate-like in shape and is more preferably foil-like. The porous part and the core part are disposed on at least one principal surface of the valve-acting metal substrate. Alternatively, the porous part and the core part may be disposed on each of the principal (typically opposed) surfaces of the valve-acting metal substrate. The porous part is preferably an etched layer formed in the surface of the core part.

The thickness of the core part is preferably 5 μm or more and 100 μm or less. The thickness of the porous part (the thickness of one porous part except the core part) is preferably 5 μm or more and 200 μm or less.

In the solid electrolytic capacitor according to the present invention, the dielectric layer is formed in the surface of the porous part of the valve-acting metal substrate. Reflecting the conditions of the surface of the porous part, the dielectric layer disposed in the surface of the porous part is porous and has a surface with fine irregularities. The dielectric layer is preferably a film composed of an oxide of the valve-action metal. In the case where, for example, an aluminum foil is used as a valve-acting metal substrate, a dielectric layer that is an oxide film may be formed by subjecting the surface of the aluminum foil to an anodic oxidation treatment (i.e., chemical conversion) in an aqueous solution containing ammonium adipate or the like. It is preferable that the dielectric layer be not formed on the surface of the core part.

Examples of the material constituting the insulating layer included in the solid electrolytic capacitor according to the present invention include insulative resins, such as a polyphenylsulfone resin, a polyethersulfone resin, a cyanate ester resin, a fluororesin (e.g., tetrafluoroethylene or a tetrafluoroethylene-perfluoroalkyl vinyl ether copolymer), a polyimide resin, and a polyamide imide resin and derivatives and precursors of the above insulative resins. The insulating layer may be composed of the same material as the sealing resin described below.

Examples of the material constituting the solid electrolyte layer included in the solid electrolytic capacitor according to the present invention include conductive high-molecular compounds, such as polypyrroles, polythiophenes, and polyanilines. Among the above compounds, polythiophenes are preferable and poly(3,4-ethylenedioxythiophene), that is, "PEDOT", is particularly preferable. The above conductive high-molecular compounds may include a dopant, such as polystyrene sulfonic acid (PSS). The solid electrolyte layer preferably includes an inner layer that fills the pores (recesses) of the dielectric layer and an outer layer that covers the dielectric layer.

The conductive layer included in the solid electrolytic capacitor according to the present invention preferably includes a carbon layer that serves as a backing and a silver layer disposed on the carbon layer. The conductive layer may include only a carbon layer or a silver layer. The conductive layers, such as a carbon layer and a silver layer, are preferably arranged to cover the entire surface of the solid electrolyte layer.

Examples of the material constituting the sealing resin included in the solid electrolytic capacitor according to the present invention include an epoxy resin and a phenol resin.

The solid electrolytic capacitor 1 illustrated in FIG. 1(a) is preferably produced by the following method.

FIGS. 2(a) through 2-2(l) are schematic perspective views illustrating an example of the method for producing the solid electrolytic capacitor 1 illustrated in FIG. 1(a).

A valve-acting metal substrate 11 that includes a core part 11b and a porous part 11a, such as an etched layer, disposed on the entirety of a principal surface of the core part 11b is prepared (or obtained) as illustrated in FIG. 21(a). A dielectric layer 12 is formed in the surface of the porous part 11a as illustrated in FIG. 2-1(b). As described above, in the case where, for example, an aluminum foil is used as a valve-acting metal substrate, a dielectric layer that is an oxide film may be formed by subjecting the surface of the aluminum foil to an anodic oxidation treatment (i.e., chemical conversion) in an aqueous solution containing ammonium adipate or the like.

A portion of the dielectric layer 12 and a portion of the porous part 11a are removed with a laser or the like such that the core part 11b, which serves as an anode part, is exposed as illustrated in FIG. 2-1(c). In this case, the surface of the core part 11b is at a lower level than the surface of the porous part 11a (as viewed in FIG. 2(c)). In FIG. 2-1(c), a portion of the core part 11b which acts as the peripheral portion of the valve-acting metal substrate 11 is exposed. Alternatively, the dielectric layer 12 may be formed after the core part 11b has been exposed by removing a portion of the porous part 11a. In such a case, it is preferable to form a mask on the surface of the core part 11b in order to prevent the dielectric layer 12 from being formed in the surface of the core part 11b.

In another case, in order to increase the production efficiency, a foil that has been subjected to chemical conversion, that is, a chemically converted foil, may be used as a valve-acting metal substrate provided with a dielectric layer formed in the surface of the metal base. In such a case, since the dielectric layer is disposed on the entirety of the chemically converted foil, the core part, which serves as an anode part, may be exposed by removing a portion of the dielectric layer and a portion of the porous part with a laser or the like.

Figures 1D, 2:
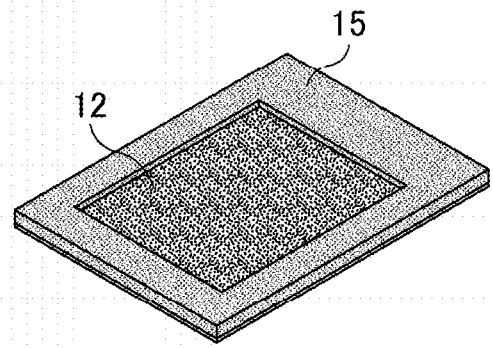

An insulating layer 15 is formed on the core part 11b by applying an insulative resin to the core part 11b as illustrated in FIG. 2-1(d). The method for applying the insulative resin is not limited. For example, a method in which a dispenser is used and screen printing may be used.

Figures 1E, 2:
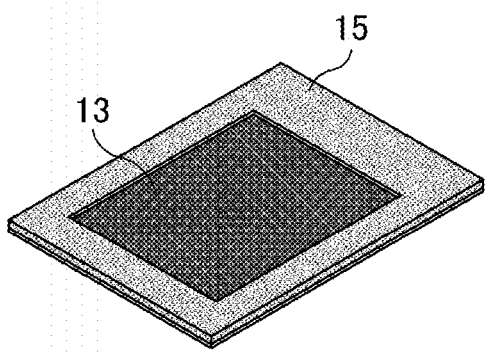

A solid electrolyte layer 13 is formed on the dielectric layer 12 as illustrated in FIG. 2-1(e). The solid electrolyte layer may be formed by, for example, forming a polymer film composed of poly(3,4-ethylenedioxythiophene) or the like on the surface of the dielectric layer using a coating liquid containing a monomer such as 3,4-ethylenedioxythiophene or by applying a dispersion containing a polymer such as poly(3,4-ethylenedioxythiophene) onto the surface of the dielectric layer and drying the resulting coating film. It is preferable to form the solid electrolyte layer by forming an inner layer that fills the pores (recesses) of the dielectric layer and subsequently forming an outer layer that covers the dielectric layer.

Figures 1F, 2:
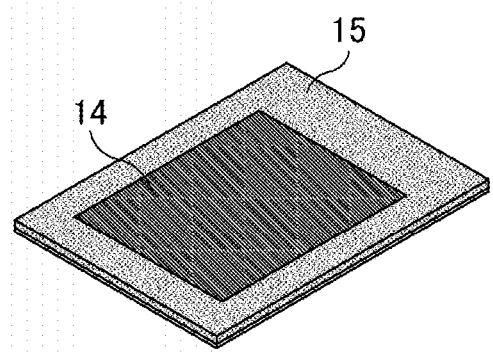
Figure 2:
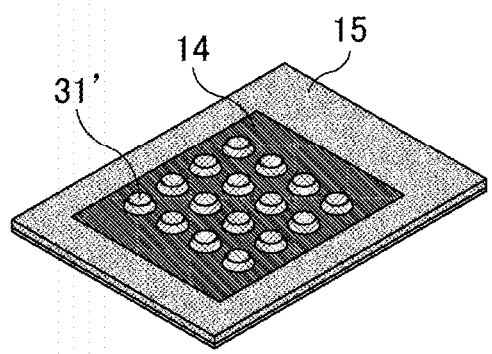
Figure 2:
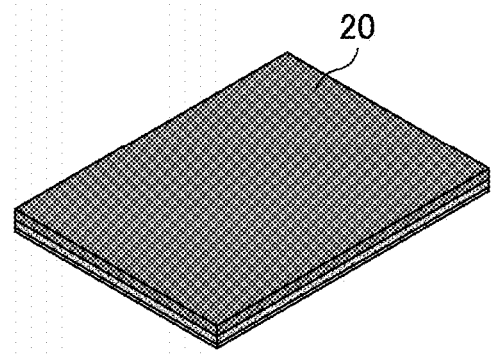
Figure 2:
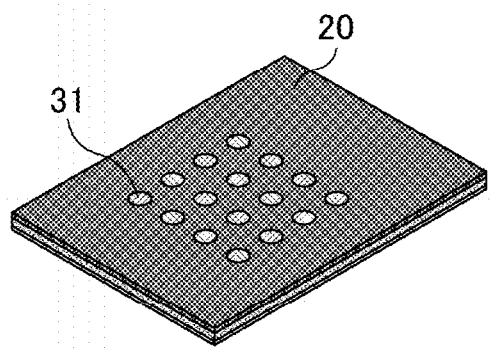
Figure 2:
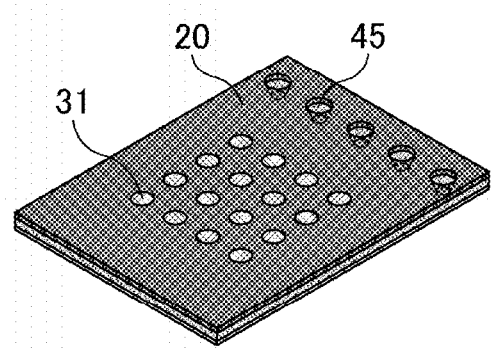
Figure 2:
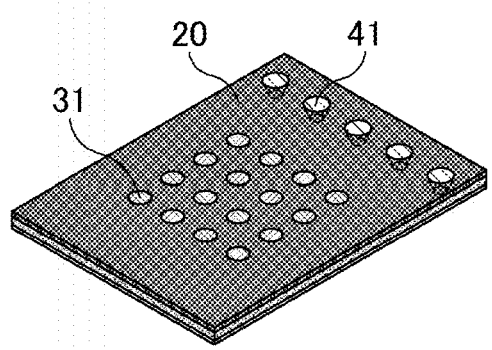
Figure 2:
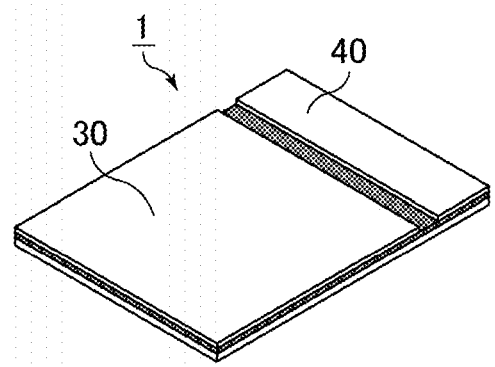

A conductive layer 14 is formed on the solid electrolyte layer 13 as illustrated in FIG. 2-1(f). It is preferable to form the conductive layer by forming a carbon layer and a silver layer successively. Alternatively, only a carbon layer may be formed. In another case, only a silver layer may be formed. The carbon layer and the silver layer may be formed by, for example, applying a carbon paste drying the resulting coating film, subsequently applying the silver paste, and drying the resulting coating film.

Bump electrodes (paste electrodes) 31' are formed on the conductive layer 14 using a conductive paste as illustrated in FIG. 2-2(g). Subsequently, a sealing resin 20 is disposed on the conductive layer 14 and the insulating layer 15 as illustrated in FIG. 2-2(h) in order to perform sealing with the sealing resin 20 such that the bump electrodes 31' are completely covered with the sealing resin 20. The sealing resin may be formed by resin molding or the like. Subsequently, the sealing resin 20 is trimmed such that the surfaces of the bump electrodes 31' are exposed as illustrated in FIG. 2-2(i). Thus, cathodic via electrodes 31 are formed in the sealing resin 20 disposed on the conductive layer 14 so as to penetrate the sealing resin 20. Note that, the cathodic via electrodes 31 are substantially the same as the bump electrodes 31'.

Via holes 45 are formed in the insulating layer 15 and the sealing resin 20 that are disposed on and above the core part 11b with a laser or the like so as to penetrate the insulating layer 15 and the sealing resin 20 as illustrated in FIG. 2-2(j). Subsequently, as illustrated in FIG. 2-2(k), first anodic via electrodes 41 are formed in the sealing resin 20 disposed on the insulating layer 15 so as to penetrate the sealing resin 20, and second anodic via electrodes 42 (not illustrated) are formed in the insulating layer 15 disposed on the core part 11b so as to penetrate the insulating layer 15. The first anodic via electrodes may be, for example, plated electrodes or paste electrodes. The second anodic via electrodes may be, for example, plated electrodes or paste electrodes.

A cathodic outer electrode 30 electrically connected to the conductive layer 14 through the cathodic via electrodes 31 and an anodic outer electrode 40 electrically connected to the core part 11b through the second anodic via electrodes 42 and the first anodic via electrodes 41 are formed as illustrated in FIG. 2-2(l). The anodic outer electrode may be, for example, a metal electrode, a paste electrode, or a ball-like terminal. The cathodic outer electrode may be, for example, a metal electrode, a paste electrode, or a ball-like terminal.

The solid electrolytic capacitor 1 illustrated in FIG. 1(a) is preferably produced by the above-described method.

Second Embodiment

In the second embodiment of the present invention, the sealing resin and the anodic outer electrode are disposed on and above the core part in this order; a first anodic via electrode is formed in the sealing resin disposed on the core part; the first anodic via electrode is arranged to come into direct contact with the core part; and the core part is electrically drawn to the surface of the sealing resin through the first anodic via electrode. In the structure according to the second embodiment of the present invention, the core part is arranged substantially close to the anodic outer electrode and the length of the via electrodes having a narrow conductive path may be relatively reduced accordingly. This makes it possible to reduce the overall resistance of the capacitor and pass a large current through the capacitor. In particular, in the case where a three-terminal capacitor is used as a circuit by-pass capacitor, the structure in which the proportion of the conductor in the conductive path is high as in the second embodiment may be advantageous, because it is desirable to maximize the current-carrying capacity between anodes. Furthermore, the anode and cathodic outer electrodes may be disposed on the same side. This makes it possible to produce a thin solid electrolytic capacitor.

Figure 3:
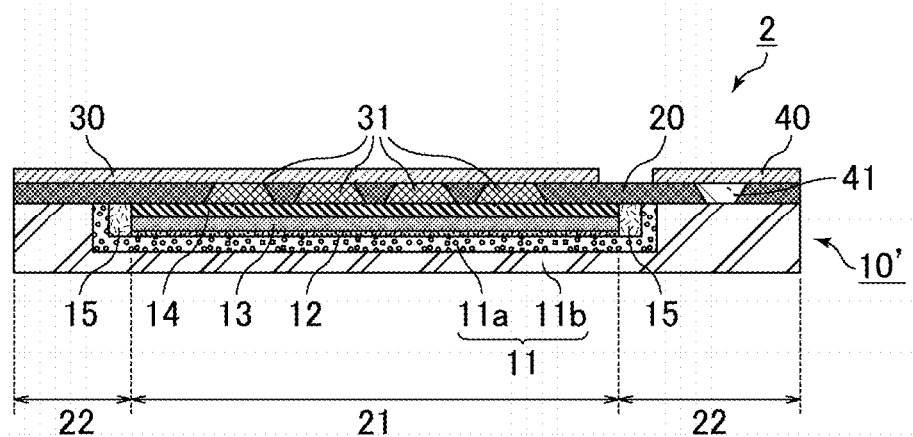
FIG. 3(a) is a schematic cross-sectional view of an example of a solid electrolytic capacitor according to a second embodiment of the present invention
FIG. 3(b) is a schematic cross-sectional view of an example of a capacitor element included in the solid electrolytic capacitor illustrated in FIG. 3(a)
FIG. 3(c) is a schematic perspective view of an example of a capacitor element included in the solid electrolytic capacitor illustrated in FIG. 3(a).
Figure 3:
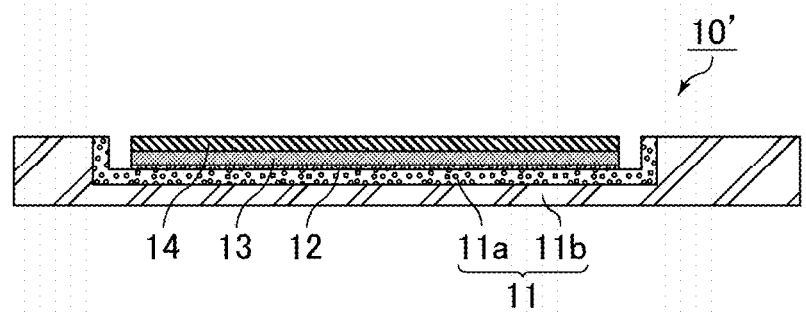
Figure 3:
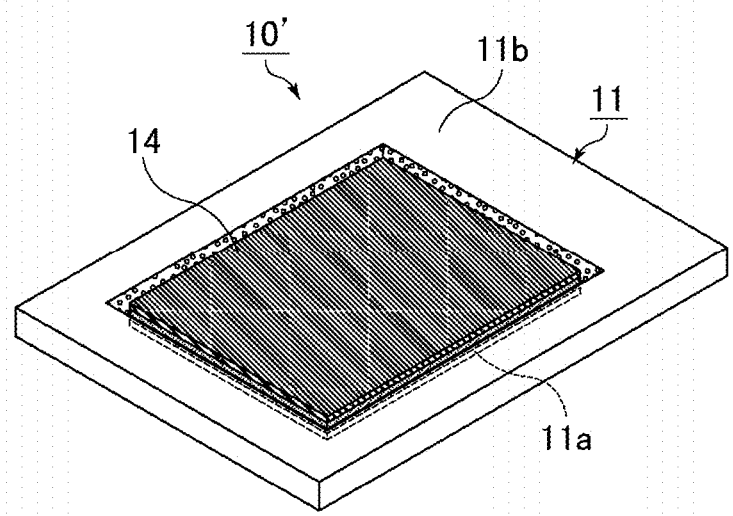

The solid electrolytic capacitor 2 illustrated in FIG. 3(a) includes a capacitor element 10', a sealing resin 20, a cathodic outer electrode 30, and an anodic outer electrode 40. As illustrated in FIGS. 3(a) and 3(b), the capacitor element 10' includes a valve-acting metal substrate 11 including a core part 11b and a porous part 11a disposed on a principal surface of the core part 11b, a dielectric layer 12 formed in the surface of the porous part 11a, a solid electrolyte layer 13 disposed on the dielectric layer 12, and a conductive layer 14 disposed on the solid electrolyte layer 13. An insulating layer 15 is disposed on a principal surface of the valve-acting metal substrate 11 and surrounds the outer periphery of the dielectric layer 12, the solid electrolyte layer 13 and the conductive layer 14 and the as illustrated in FIG. 3(a). While not shown in FIG. 3(c), the insulating layer 15 preferably extends around the entire periphery of the insulating layer 14 as viewed in FIG. 3(c).

In the solid electrolytic capacitor 2 illustrated in FIGS. 3(a), core part 11b has a recess in which the porous part 11a is located. This is shown more clearly in FIGS. 3(b) and 3(c). It is preferable that the porous part 11a be disposed at the center of the valve-acting metal substrate 11 and the core part 11b be disposed both below the core part 11b and laterally outward of (peripherally of) the core party 11b as illustrated in FIGS. 3(b) and 3(c). It is also preferable that the insulating layer 15 be disposed on the inner walls of the recess between the porous part 11a and the outer edges of the dielectric 12, the solid electrolyte layer 13 and the conductive layer 14. While the foregoing structure is preferred, the recess need not be formed in the valve-acting metal substrate 11, and the surface of the core part 11b may be at the same level as the surface of the porous part 11a or at a lower level than the surface of the porous part 11a on the principal surface of the valve-acting metal substrate 11.

A principal surface of the capacitor element 10' is sealed with the sealing resin 20. In the solid electrolytic capacitor 2 illustrated in FIG. 3(a), the sealing resin 20 is disposed on the conductive layer 14 and the core part 11b so as to cover the principal surface of the capacitor element 10'.

The cathodic outer electrode 30 is electrically connected to the conductive layer 14. In the solid electrolytic capacitor 2 illustrated in FIG. 3(a), the sealing resin 20 and the cathodic outer electrode 30 are disposed on and above the conductive layer 14 in this order, and cathodic via electrodes 31 are formed in the sealing resin 20 disposed on the conductive layer 14 so as to penetrate the sealing resin 20. The conductive layer 14 (a cathode part 21) is electrically drawn to the surface of the sealing resin 20 through the cathodic via electrodes 31. The cathodic via electrodes 31 exposed at the surface of the sealing resin 20 are connected to the cathodic outer electrode 30.

The form, cross-sectional shape, etc. of the cathodic via electrodes 31 are preferably the same as in the first embodiment. The form, shape, etc. of the cathodic outer electrode 30 are also preferably the same as in the first embodiment.

The anodic outer electrode 40 is electrically connected to the core part 11b. In the solid electrolytic capacitor 2 illustrated in FIG. 3(a), the sealing resin 20 and the anodic outer electrode 40 are disposed on and above the core part 11b in this order. A first anodic via electrode 41 is formed in the sealing resin 20 disposed on the core part 11b so as to penetrate the sealing resin 20. The first anodic via electrode 41 is arranged to come into direct contact with the core part 11b. The core part 11b (an anode part 22) is electrically drawn to the surface of the sealing resin 20 through the first anodic via electrode 41. The first anodic via electrode 41 exposed at the surface of the sealing resin 20 is connected to the anodic outer electrode 40.

The form, cross-sectional shape, etc. of the first anodic via electrode 41 are preferably the same as in the first embodiment. The form, shape, etc. of the anodic outer electrode 40 are also the same as in the first embodiment.

In FIG. 3(a), the cathodic outer electrode 30 and the anodic outer electrode 40 are arranged not to come into contact with each other and to be insulated from each other on the surface of the sealing resin 20.

Various modification are possible. For example, a surface of the solid electrolytic capacitor 2 which is other than the surface that includes the anodic outer electrode 40 and the cathodic outer electrode 30 may be covered with another insulating layer in order to protect the other surface. Moreover, a stress relaxation layer, a damp-proof membrane, and the like may optionally be interposed between the capacitor element and the sealing resin in order to protect the capacitor element.

The material constituting the valve-acting metal substrate included in the capacitor element, etc. are preferably the same as in the first embodiment. The thickness of the core part is preferably 5 μm or more and 300 μm or less. The thickness of the porous part (the thickness of one porous part except the core part) is preferably 5 μm or more and 200 μm or less. In the case where a recess is formed in the valve-acting metal substrate, the depth of the recess is preferably 5 μm or more and 200 μm or less.

The materials constituting the dielectric layer, the solid electrolyte layer, the conductive layer, the insulating layer, and the sealing resin that are included in the capacitor element, etc. are preferably the same as in the first embodiment. In the case where the porous part is disposed in the recess of the valve-acting metal substrate, it is preferable that the solid electrolyte layer and the conductive layer be not protruded from the recess.

The solid electrolytic capacitor 2 illustrated in FIG. 3(a) is preferably produced by the following method.

Figures 1A, 4:
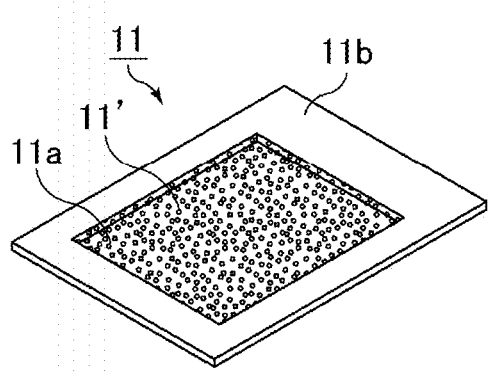
Figures 1B, 4:
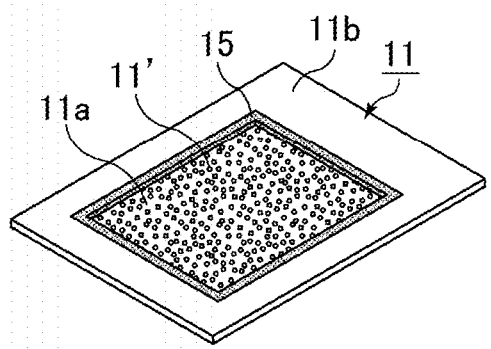
Figures 1C, 4:
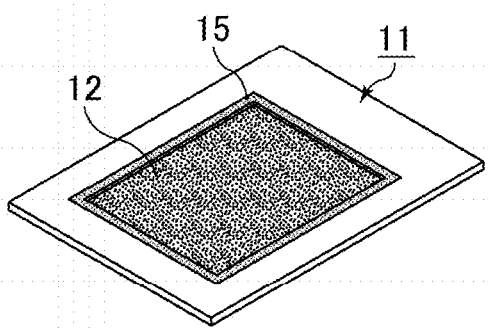
Figures 1D, 4:
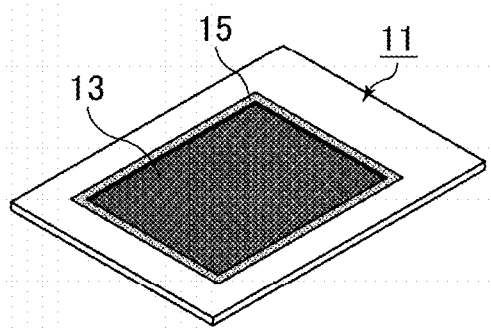
Figures 1E, 4:
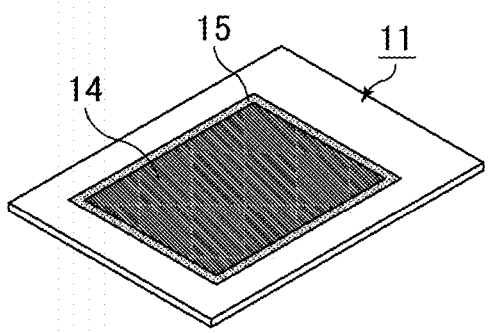
Figures 2, 4:
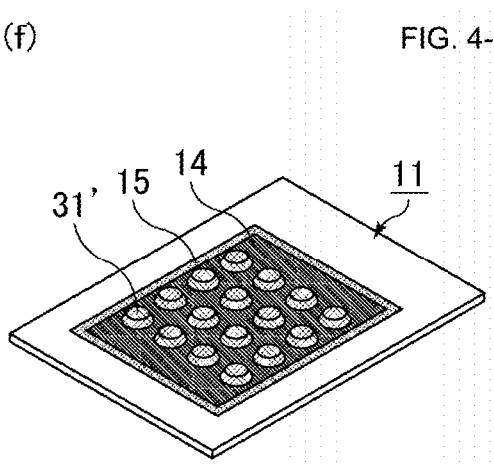
Figures 2, 4:
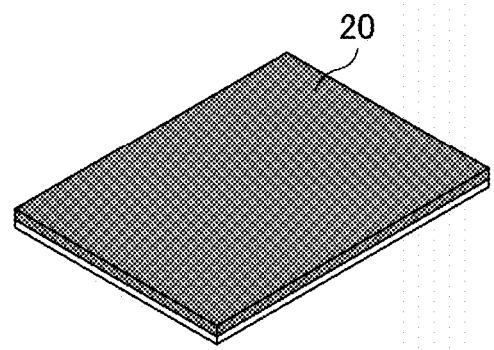
Figures 2, 4:
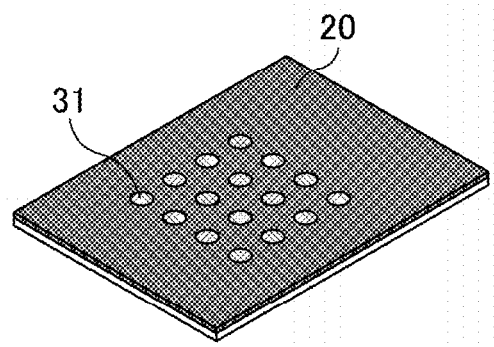
Figures 2, 4:
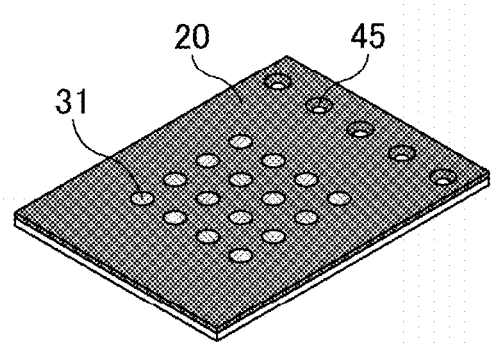
Figures 2, 4:
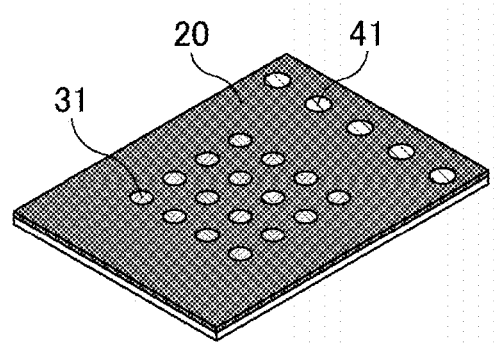
Figures 2, 4:
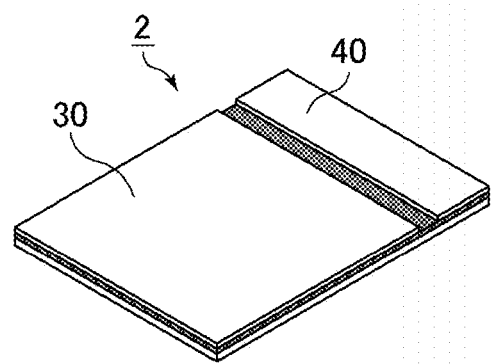

FIGS. 4-1(a) through 4-2(k) are schematic perspective views illustrating an example of the method for producing the solid electrolytic capacitor 2 illustrated in FIG. 3(a).

As illustrated in FIG. 4-1(a), a recess 11' is formed in a valve-acting metal substrate 11 including a core part 11b, and a porous part 11a, such as an etched layer, is formed in the inner surface of the recess 11'. The recess may be formed by any method. For example, cutting, pressing, and etching may be used. The recess 11' and the porous part 11a may be simultaneously formed by etching. In FIG. 4-1(a), the core part 11b that surrounds the recess 11' and acts the peripheral portion of the valve-acting metal substrate 11 serves as an anode part. In this case, the surface of the core part 11b is at a higher level than the surface of the porous part 11a.

An insulating layer 15 is formed on the peripheral portion of the recess 11', which comes into contact with the core part 11b, by applying an insulative resin to the peripheral portion of the recess 11' as illustrated in FIG. 4-1(b). The method for applying the insulative resin is not limited. For example, a method in which a dispenser is used and screen printing may be used. Alternatively, the porous part 11a may be formed in the inner surface of the recess 11' after the insulating layer 15 has been formed on the peripheral portion of the recess 11'.

A dielectric layer 12 is formed in the surface of the porous part 11a as illustrated in FIG. 4-1(c). It is preferable to form a mask on the surface of the core part 11b in order to prevent the dielectric layer 12 from being formed in the surface of the core part 11b.

A solid electrolyte layer 13 is formed on the dielectric layer 12 as illustrated in FIG. 4-1(d). It is preferable to form the solid electrolyte layer by forming an inner layer that fills the pores of the dielectric layer and subsequently forming an outer layer that covers the dielectric layer.

A conductive layer 14 is formed on the solid electrolyte layer 13 as illustrated in FIG. 4-1(e). It is preferable to form the conductive layer by forming a carbon layer and a silver layer successively. Alternatively, only a carbon layer may be formed. In another case, only a silver layer may be formed.

Bump electrodes (paste electrodes) 31' are formed on the conductive layer 14 using a conductive paste as illustrated in FIG. 4-2(f). Subsequently, a sealing resin 20 is disposed on the core part 11b, the conductive layer 14, and the insulating layer 15 as illustrated in FIG. 4-2(g) in order to perform sealing with the sealing resin 20 such that the bump electrodes 31' are completely covered with the sealing resin 20. The sealing resin may be formed by resin molding or the like. Subsequently, the sealing resin 20 is trimmed such that the surfaces of the bump electrodes 31' are exposed as illustrated in FIG. 4-2(h). Thus, cathodic via electrodes 31 are formed in the sealing resin 20 disposed on the conductive layer 14 so as to penetrate the sealing resin 20. The cathodic via electrodes 31 are substantially the same as the bump electrodes 31'.

Via holes 45 are formed in the sealing resin 20 disposed on the core part 11b with a laser or the like so as to penetrate the sealing resin 20 as illustrated in FIG. 4-2(i). Subsequently, first anodic via electrodes 41 are formed in the sealing resin 20 disposed on the core part 11b so as to penetrate the sealing resin 20 as illustrated in FIG. 4-2(j). The first anodic via electrodes may be, for example, plated electrodes or paste electrodes.

A cathodic outer electrode 30 electrically connected to the conductive layer 14 through the cathodic via electrodes 31 and an anodic outer electrode 40 electrically connected to the core part 11b through the first anodic via electrodes 41 are formed as illustrated in FIG. 4-2(k). The anodic outer electrode may be, for example, a metal electrode, a paste electrode, or a ball-like terminal. The cathodic outer electrode may be, for example, a metal electrode, a paste electrode, or a ball-like terminal.

The solid electrolytic capacitor 2 illustrated in FIG. 3(a) is produced by the above-described method.

Other Embodiments

The solid electrolytic capacitor according to the present invention is not limited to the above-described embodiments. Variations and modifications may be made to the structure, production conditions, etc. of the solid electrolytic capacitor within the scope of the present invention.

In particular, the method for electrically connecting the core part to the anodic outer electrode is not limited to the methods described in the first and second embodiments. Although the core part 11b (the anode part 22) is electrically drawn to the surface of the sealing resin 20 through the first and second anodic via electrodes 41 and 42 in the solid electrolytic capacitor 1 illustrated in FIG. 1(a) and the core part 11b (the anode part 22) is electrically drawn to the surface of the sealing resin 20 through the first anodic via electrode 41 in the solid electrolytic capacitor 2 illustrated in FIG. 3(a), the solid electrolytic capacitor according to the present invention does not necessarily include the anodic via electrode, such as the first anodic via electrode. Alternatively, for example, a lead frame may be disposed on the bottom surface of the capacitor element 10 or 10'. In the case where the anodic via electrode is not formed, the sealing resin is not necessarily disposed on a portion of the core part in which the cathode part is not formed.

In the solid electrolytic capacitor according to the present invention, the number of the anode terminals is not limited to one; the solid electrolytic capacitor may include two or more anode terminals as described in the first embodiment. Similarly to anode terminals, the number of the cathode terminals is not limited to one; the solid electrolytic capacitor may include two or more cathode terminals.

REFERENCE SIGNS LIST 1, 2 SOLID ELECTROLYTIC CAPACITOR
10, 10' CAPACITOR ELEMENT
11 VALVE-ACTING METAL SUBSTRATE
11' RECESS
11a POROUS PART
11b CORE PART
12 DIELECTRIC LAYER
13 SOLID ELECTROLYTE LAYER
14 CONDUCTIVE LAYER
15 INSULATING LAYER
20 SEALING RESIN
21 CATHODE PART
22 ANODE PART
30 CATHODIC OUTER ELECTRODE
31 CATHODIC VIA ELECTRODE
31' BUMP ELECTRODE
40 ANODIC OUTER ELECTRODE
41 FIRST ANODIC VIA ELECTRODE
42 SECOND ANODIC VIA ELECTRODE
45 VIA HOLE

The invention claimed is:
1. A solid electrolytic capacitor, comprising:
a valve-acting metal substrate including a core part having an upper surface and a porous part disposed on a central portion of the upper surface of the core part such that a lateral end of the upper surface of the core part is not covered by the porous part and an outer edge of the porous part extend above the upper surface of the core part;
a dielectric layer formed on an upper surface of the porous part;
a solid electrolyte layer disposed on an upper surface of the dielectric layer;
a conductive layer disposed on an upper surface of the solid electrolyte layer;
an electrically insulating layer formed on the upper surface of the lateral end of the core part and covering the outer edge of the porous part;

a sealing resin located on the conductive layer and an upper surface of the insulating layer;

a cathodic outer electrode located on the sealing resin and being electrically connected to the conductive layer by a cathodic via electrode which extends through the sealing resin; and an anodic outer electrode electrically connected to the core part.

2. The solid electrolytic capacitor according to claim 1, wherein the cathodic via electrode is a paste electrode including a material formed by curing a conductive paste.

3. The solid electrolytic capacitor according to claim 1, wherein the cathodic via electrode is a columnar metal pin.

4. The solid electrolytic capacitor according to claim 1, wherein, the upper surface of the core part is a planar surface and the cathodic outer electrode has a larger size than the cathodic via electrode when viewed in a direction normal to the plane of the principal surface of the capacitor element, so as to cover the cathodic via electrode.

5. The solid electrolytic capacitor according to claim 1, wherein the insulating layer is composed of the same material as the sealing resin.

6. The solid electrolytic capacitor according to claim 1, wherein the anodic outer electrode and the cathodic outer electrode are metal electrodes including a metal film.

7. The solid electrolytic capacitor according to claim 1, wherein the anodic outer electrode and the cathodic outer electrode are paste electrodes including a material formed by curing a conductive paste.

8. The solid electrolytic capacitor according to claim 1, wherein the anodic outer electrode is a ball-like terminal.

9. The solid electrolytic capacitor according to claim 1, wherein the cathodic outer electrode is a ball-like terminal.

10. The solid electrolytic capacitor according to claim 1, wherein a stress relaxation layer is interposed between the conductive layer and the sealing resin.

11. The solid electrolytic capacitor according to claim 1, wherein a damp-proof membrane is interposed between the conductive layer and the sealing resin.

12. The solid electrolytic capacitor of claim 1, wherein the porous part of the valve-acting metal substrate as a periphery and the lateral end of the core part extends around the entire periphery the porous part.

13. The solid electrolytic capacitor of claim 1, wherein an anodic outer electrode is connected to the core part by a anodic via electrode which extends through a portion of the insulating layer which is located above the upper surface of the lateral end of the core part.

14. The solid electrolyte capacitor of claim 13, wherein the anodic via electrode penetrates the sealing resin at a location over the insulating layer.

15. The solid electrolyte capacitor of claim 14, wherein the anodic via electrode comprises a first anodic via electrode which penetrates the sealing resin and a second anodic via electrode which penetrates the insulating layer at a location disposed on the core part.

16. The solid electrolytic capacitor according to claim 15, wherein each of the first and second anodic via electrodes has a tapered cross-sectional shape wherein the width of the tapered cross-sectional shape increases in the direction from the core part toward the anodic outer electrode.

17. The solid electrolytic capacitor according to claim 15, wherein the first and second anodic via electrodes are columnar metal pins.

18. The solid electrolyte capacitor of claim 1, wherein the cathodic outer electrode located on the sealing resin and is electrically connected to the conductive layer by a plurality of cathodic via electrodes, each of which extends through the sealing resin.

19. A solid electrolyte capacitor, comprising:
(a) a valve-acting metal substrate including:
(i) a core part having an upper surface and a recess extending from the upper surface to a position below the upper surface, the recess having a bottom and side walls; and
(ii) a porous part disposed on the bottom and side walls of the recess;
(b) a dielectric layer formed on an upper surface of a portion of the porous part located on the bottom of the recess and being spaced from the side walls of the recess;
(c) a solid electrolyte layer disposed on an upper surface of the dielectric layer and being spaced from the side walls of the recess;
(d) a conductive layer disposed on an upper surface of the solid electrolyte layer and being spaced from the side walls of the recess;
(e) an electrically insulating layer located between the porous part on the one hand and the dielectric layer, the solid electrolyte layer and the conductive layer on the other;
(f) a sealing resin located on the conductive layer and an upper surface of the insulating layer;
(g) a cathodic outer electrode located on the sealing resin and being electrically connected to the conductive layer by a cathodic via electrode which extends through the sealing resin; and
(h) an anodic outer electrode electrically connected to the core part.

20. The solid electrolyte capacitor of claim 19, wherein:
the sealing layer is located on the upper surface of the core part; and
the anodic outer electrode is located on the sealing layer at a position above the upper surface of the core part; and
an anodic via electrode which extends through the sealing layer to electrically couple the anodic outer electrode to the core part.

21. The solid electrolyte capacitor of claim 20, wherein the cathodic outer electrode located on the sealing resin and is electrically connected to the conductive layer by a plurality of cathodic via electrodes, each of which extends through the sealing resin.

22. The solid electrolyte capacitor of claim 19, wherein the recess has a parallelepiped shape.

23. The solid electrolyte capacitor of claim 19, wherein the recess has a rectangular parallelepiped shape.

* * * * *